(12) United States Patent
Sowder et al.

(10) Patent No.: US 8,457,483 B2
(45) Date of Patent: *Jun. 4, 2013

(54) PHOTOGRAPHIC SYSTEM

(75) Inventors: Erik Sowder, Watsonville, CA (US); John B. Baker, Watsonville, CA (US)

(73) Assignee: Expolmaging, Inc., Watsonville, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/018,201

(22) Filed: Jan. 31, 2011

(65) Prior Publication Data

US 2011/0216520 A1 Sep. 8, 2011

Related U.S. Application Data

(60) Provisional application No. 61/309,748, filed on Mar. 2, 2010.

(51) Int. Cl.
*G03B 15/03* (2006.01)
*G03B 15/06* (2006.01)

(52) U.S. Cl.
USPC .......................................... 396/155; 396/200

(58) Field of Classification Search
USPC ................................... 396/155, 200
See application file for complete search history.

(56) References Cited

U.S. PATENT DOCUMENTS

| | | |
|---|---|---|
| D93,321 S | 5/1934 | Arras |
| 2,193,485 A | 3/1940 | Kenning |
| 2,356,694 A | 8/1944 | Potter et al. |
| D148,099 S | 12/1947 | Tanchuck |
| 2,586,583 A | 2/1952 | Wagner |
| 2,714,153 A | 7/1955 | Talbot |
| D207,551 S | 5/1967 | Spaulding |
| 3,497,750 A | 2/1970 | Knochel |
| 3,500,036 A | 3/1970 | Szentveri |
| 3,894,225 A | 7/1975 | Chao |
| 3,939,340 A | 2/1976 | Gozzano et al. |
| 4,052,607 A | 10/1977 | Larson |
| 4,075,472 A | 2/1978 | Higuchi |
| 4,078,170 A | 3/1978 | Sloop |
| 4,146,918 A | 3/1979 | Tureck |
| 4,173,035 A | 10/1979 | Hoyt |

(Continued)

FOREIGN PATENT DOCUMENTS

| | | |
|---|---|---|
| JP | 06-075312 | 3/1994 |
| KR | 10-0685218 | 2/2007 |

OTHER PUBLICATIONS

Joergensen, Flash snoots and grids, blog.nikonians.org, Aug. 28, 2008.*

(Continued)

*Primary Examiner* — Rodney Fuller

(57) ABSTRACT

A photographic system includes a first light grid including cells, and a first alignment feature. A bezel including a retainer for retaining at least the first light grid, and an alignment feature for aligning at least the first light grid within said light grid retainer. A formable portion including a reflective surface, wherein the formable portion is for retainably formed into a snoot, wherein said bezel is disposed at a distal end of the formable portion, and wherein the reflective surface is for reflecting light from a photographic light source within the formable portion. A base portion coupled to the formable portion, wherein the base portion is for coupling to the photographic light source.

42 Claims, 17 Drawing Sheets

U.S. PATENT DOCUMENTS

| | | | |
|---|---|---|---|
| 4,177,399 A | 12/1979 | Muccigrosso et al. | |
| 4,428,030 A | 1/1984 | Baliozian | |
| 4,446,506 A | 5/1984 | Larson | |
| 4,458,177 A | 7/1984 | Hunter et al. | |
| 4,460,946 A | 7/1984 | Tinz | |
| 4,490,776 A | 12/1984 | Kluch | |
| 4,504,888 A | 3/1985 | Rosenthal | |
| 4,513,023 A | 4/1985 | Wary | |
| 4,524,405 A | 6/1985 | Heard | |
| 4,594,645 A | 6/1986 | Terashita | |
| 4,633,374 A | 12/1986 | Waltz et al. | |
| 4,653,884 A | 3/1987 | Johnson et al. | |
| 4,669,031 A | 5/1987 | Regester | |
| 4,730,146 A | 3/1988 | Maser et al. | |
| 4,757,425 A | 7/1988 | Waltz | |
| 4,824,194 A | 4/1989 | Karasawa | |
| 4,934,093 A | 6/1990 | Yanna | |
| 4,945,675 A | 8/1990 | Kendrick | |
| 5,032,016 A | 7/1991 | Youngkeit | |
| D320,865 S | 10/1991 | Chang | |
| 5,154,503 A * | 10/1992 | Sternsher | 362/16 |
| D342,273 S * | 12/1993 | Couch | D16/237 |
| 5,311,409 A * | 5/1994 | King | 362/17 |
| D376,440 S | 12/1996 | Chan | |
| 5,651,086 A | 7/1997 | Russell | |
| D385,635 S | 10/1997 | Nebelsieck | |
| 5,673,995 A | 10/1997 | Segaud | |
| 5,680,496 A | 10/1997 | Burkitt et al. | |
| 5,778,264 A * | 7/1998 | Kean | 396/174 |
| 5,839,006 A | 11/1998 | Beckerman | |
| D402,393 S | 12/1998 | Kuo | |
| 5,872,883 A | 2/1999 | Ohba et al. | |
| 5,950,017 A | 9/1999 | Reff | |
| 6,010,234 A | 1/2000 | Rahn | |
| D424,232 S | 5/2000 | Tihany | |
| 6,123,443 A | 9/2000 | Conway | |
| 6,234,638 B1 | 5/2001 | Beverly | |
| 6,449,897 B1 | 9/2002 | Gaston | |
| 6,630,783 B1 | 10/2003 | Ono | |
| 6,709,121 B1 | 3/2004 | Lowe et al. | |
| 6,732,666 B2 | 5/2004 | Layt | |
| 6,733,145 B2 | 5/2004 | Shirilla | |
| 6,808,295 B2 | 10/2004 | Waltz et al. | |
| D500,165 S | 12/2004 | Parres | |
| D541,971 S | 5/2007 | Hamel et al. | |
| D544,131 S | 6/2007 | Blackman | |
| D548,872 S | 8/2007 | Dubbeldam et al. | |
| D555,440 S | 11/2007 | Murray | |
| D560,301 S | 1/2008 | Compton et al. | |
| D562,493 S | 2/2008 | Chen | |
| D564,691 S | 3/2008 | Ertze Encinas et al. | |
| 7,347,606 B1 | 3/2008 | Patten | |
| 7,360,909 B1 * | 4/2008 | Hughes | 362/18 |
| D569,539 S | 5/2008 | Behar et al. | |
| D577,455 S | 9/2008 | Zheng et al. | |
| D598,156 S | 8/2009 | Xiao et al. | |
| D598,597 S | 8/2009 | Lu et al. | |
| D606,231 S | 12/2009 | Sabernig | |
| 7,645,046 B1 | 1/2010 | Kuntz | |
| D609,383 S | 2/2010 | Chang | |
| D609,387 S | 2/2010 | Compton | |
| D610,287 S | 2/2010 | Gill | |
| D617,032 S | 6/2010 | Baylar | |
| D617,494 S | 6/2010 | Lin | |
| 7,748,875 B2 * | 7/2010 | Fong | 362/355 |
| D622,432 S | 8/2010 | Yan | |
| D641,100 S * | 7/2011 | Li | D26/118 |
| 7,978,971 B1 * | 7/2011 | Honl | 396/198 |
| 2008/0239695 A1 * | 10/2008 | Manger | 362/18 |
| 2010/0124068 A1 * | 5/2010 | Karle | 362/433 |
| 2011/0216519 A1 * | 9/2011 | Sowder et al. | 362/11 |
| 2011/0217028 A1 * | 9/2011 | Sowder et al. | 396/4 |

OTHER PUBLICATIONS

Using a Cooling Honeycomb As a DIY Gridspot, www.diyphotography.net, Oct. 13, 2006.*

HonlPhoto 1/8 Speed Grid for Portable Flash, www.honlphoto.com, Feb. 5, 2009.*

HonlPhoto Speed Snoot, www.honlphoto.com, Feb. 5, 2009.*

* cited by examiner

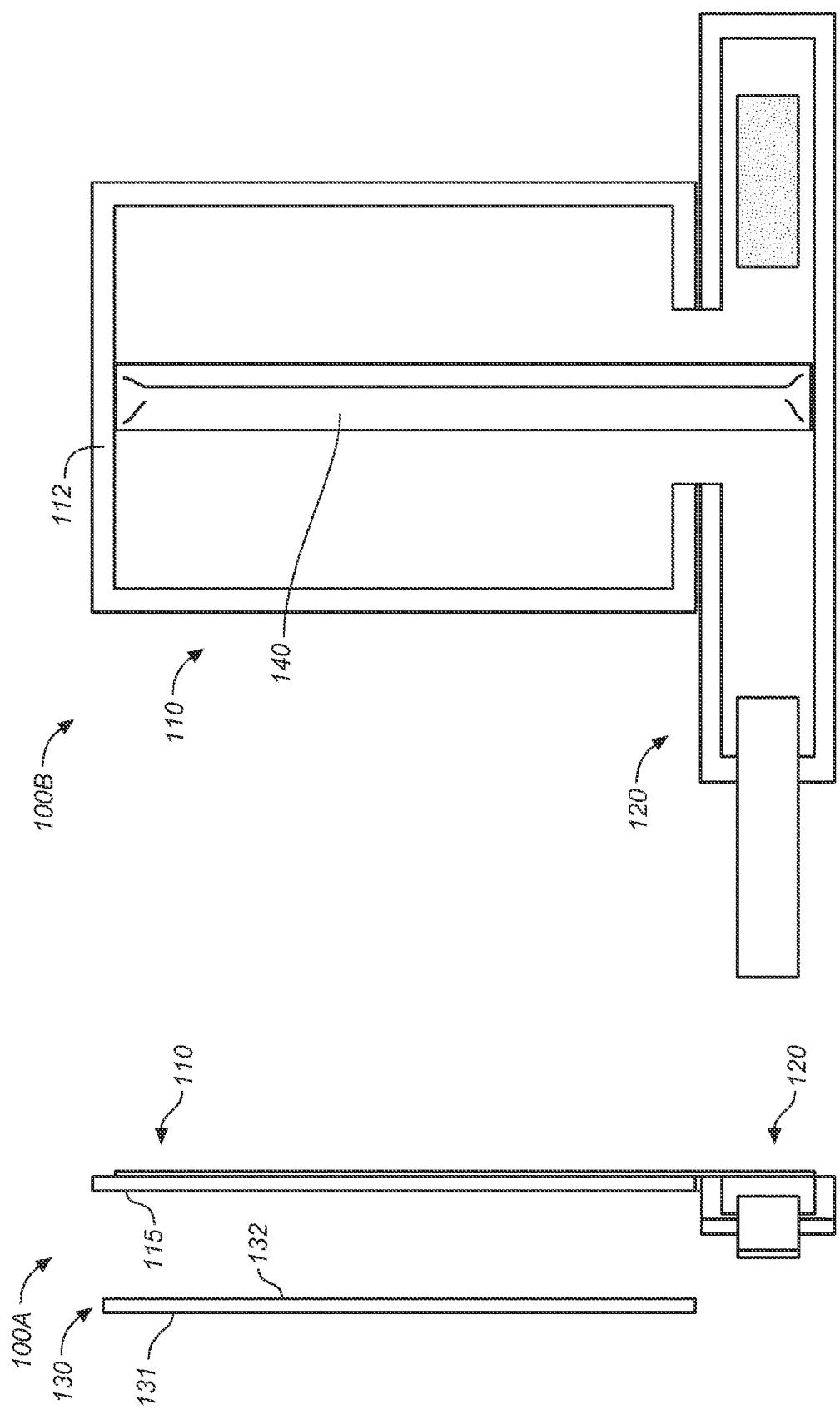

PHOTOGRAPHIC SYSTEM

CROSS-REFERENCE TO RELATED U.S. APPLICATIONS

This Application claims priority to and benefit of U.S. Provisional Patent Application 61/309,748, entitled "Positionable Reflector," with filing date Mar. 2, 2010, assigned to the assignee of the present application.

This Application is related to U.S. patent application Ser. No. 13/018,104, entitled, "Formable Photographic Device" by Baker et al., with filing date Jan. 31, 2011, and assigned to the assignee of the present application.

This Application is related to U.S. patent application Ser. No. 13/018,181, entitled, "Photographic Devices" by Baker et al., with filing date Jan. 31, 2011, and assigned to the assignee of the present application.

BACKGROUND

Photographers use a variety of accessories to control light emitted by photographic lighting equipment. There are many aspects of light that photographers desire to control. For example, color, direction, intensity, contrast, etc. As such, photographers require a plurality of accessories to control the light. Accordingly, it may be cumbersome to carry around and have all the accessories necessary to control all the different aspects of lighting.

Moreover, photographic accessories (e.g., a reflector) are not easily manipulated to precisely control the light. For example, it may be difficult to properly place and articulate a white piece of paper to reflect light.

BRIEF DESCRIPTION OF THE DRAWINGS

FIGS. 1-12 illustrate examples of photographic devices, in accordance with embodiments of the present invention.

Figure 1:
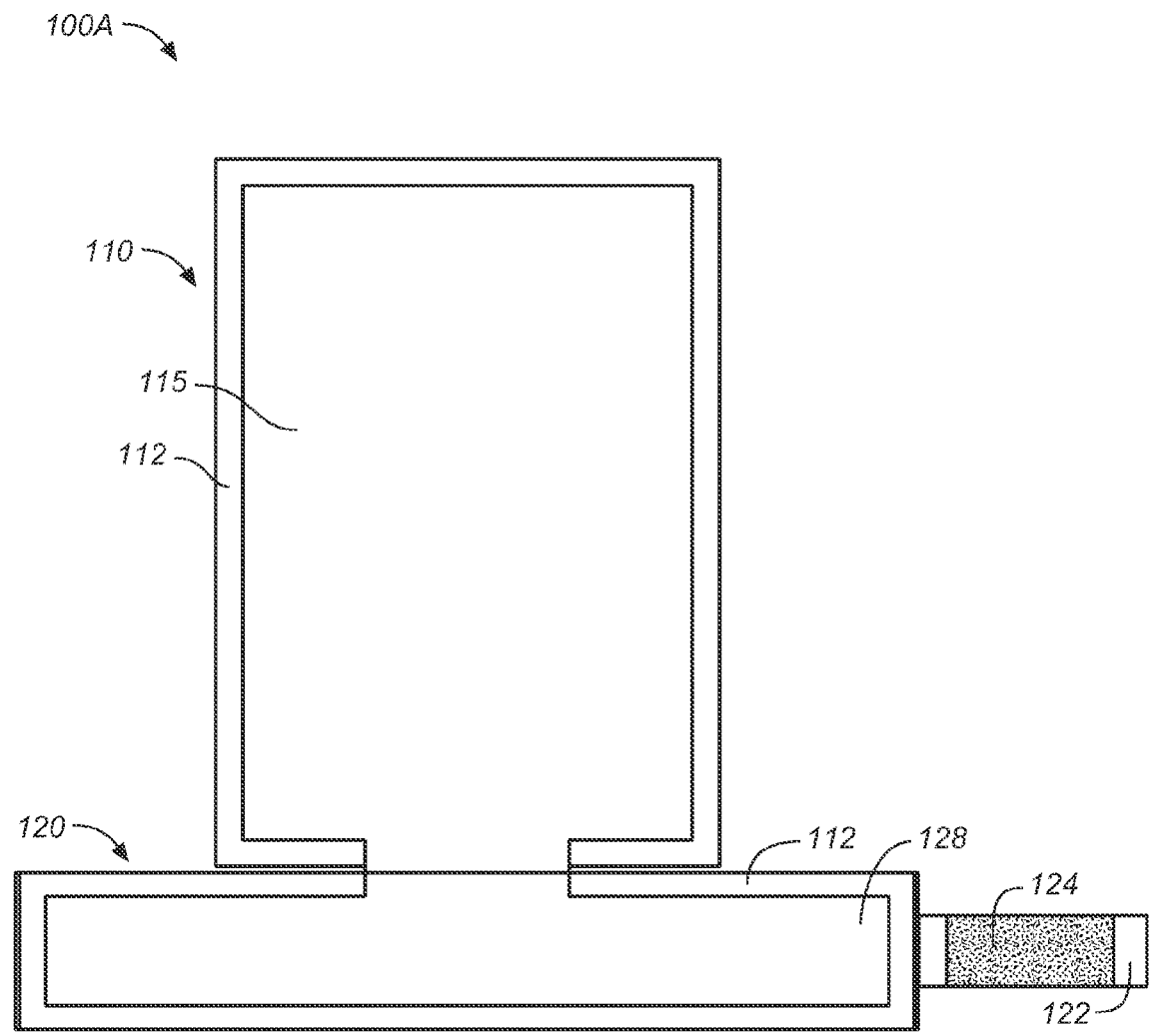
Figure 2:
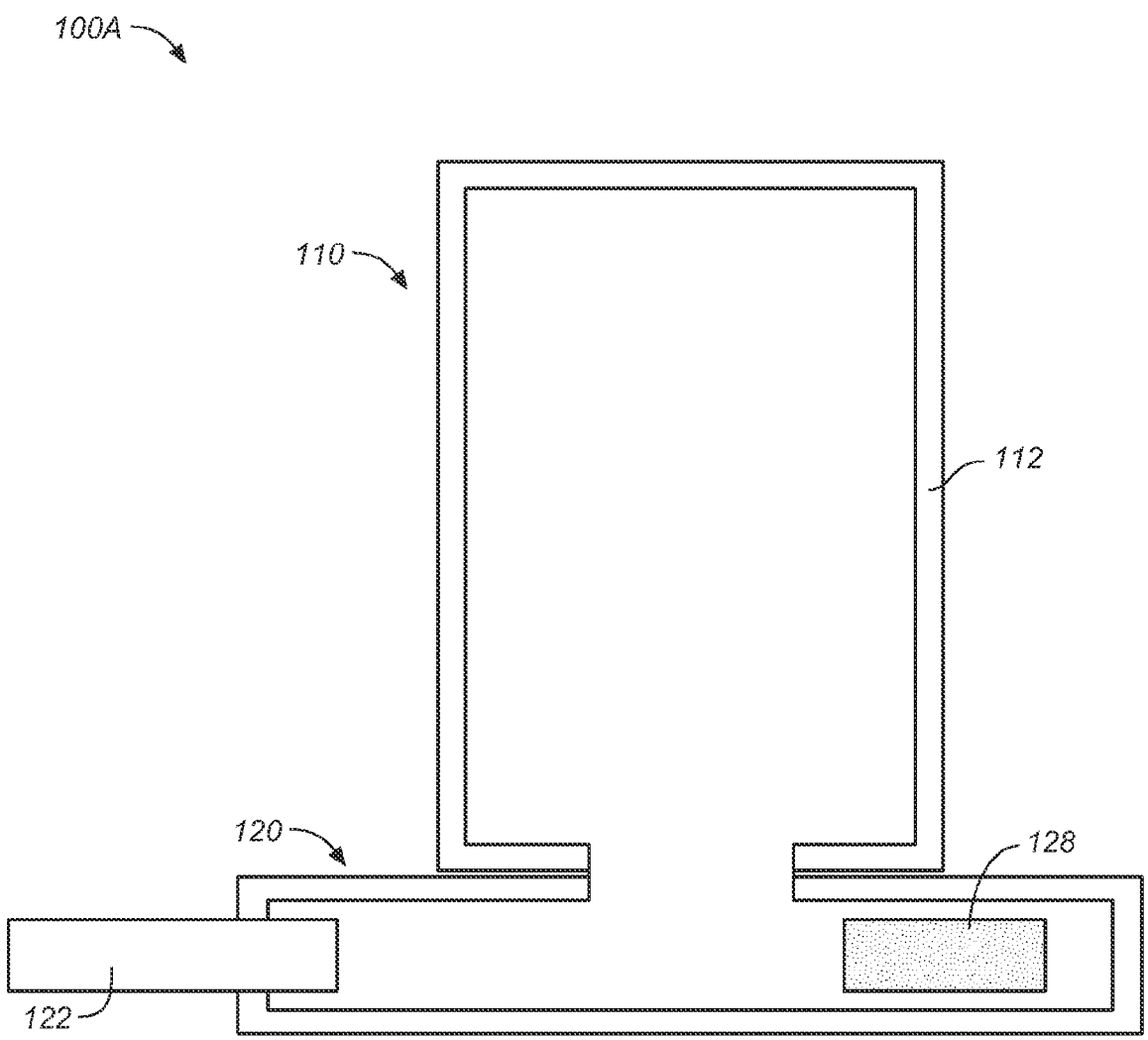

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments of a Formable Device

FIGS. 1-4 depict embodiments of device 100A. Device 100A includes formable portion 110 and base portion 120.

Formable portion 110 includes reflective surface 115. Reflective surface 115 is for reflecting light from a light source. In particular, a photographer can control, among other things, the amount of light and/or the direction of the light based on the reflection of light from reflective surface 115.

Reflective surface 115 can be any surface or material capable of properly reflecting light from a photographic light source. In one embodiment, reflective surface is polyvinyl chloride (PVC) material.

Reflective surface 115 can be integral with formable portion. In one embodiment, reflective surface 115 is a separate sheet that is attached to formable portion 110. For example, reflective surface 115 is a sheet of PVC that is stitched to formable portion 110.

Reflective surface 115 is a neutral white color. However, reflective surface can be any desired color that is able to reflect light in a photographic environment.

Formable portion 110 is configured for retainably forming into a plurality of shapes. Accordingly, reflective portion 115 is able to be retainably formed into a plurality of shapes. In other words, formable portion 110 can be retainably shaped or molded into a plurality of different shapes that are desired by a user to properly control light reflecting off of reflective portion 115. Therefore, light from a light source will reflect from reflective surface 115 according to the shape of reflective surface 115.

It should be appreciated that formable portion 110 is formed into any desired shape that is able to be formed by formable portion 110. Formable portion 110 comprises any material that is able to maintain a shape. The material can be, but is not limited to, woven fabrics, composite materials, etc. The shapes can be, but are not limited to, a curve, a parabola, a cylinder (e.g., snoot), which will be described in detail below.

Figure 3:
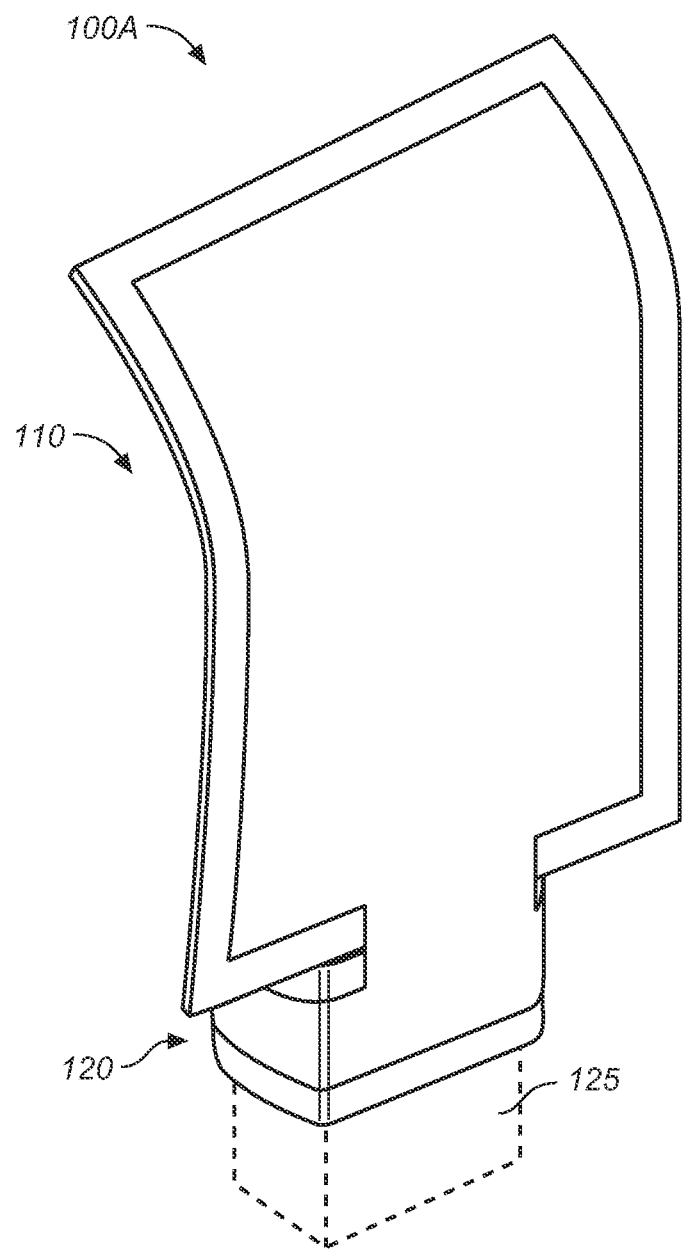

Referring to FIG. 3, reflective surface 115 of formable portion 110 is formed to have a curve, as depicted. To create such a shape, a user forms formable portion 110, as desired. In particular, once a desired shape is created, the desired shape of reflective surface 115 is retained until a user forms reflective surface 115 into another desired shape.

Referring now to FIG. 4, device 100A includes cover 130 configured to cover reflective surface 115. Cover 130 is releasably coupled over reflective surface 115. It should be appreciated that cover 130 is one of a plurality of different covers that include a plurality of different colored reflective surfaces. In various embodiments, cover 130 is releasably coupled via snaps, hook and loop, adhesive, etc.

In one embodiment, cover 130 is a reflective cover that includes reflective surfaces 131 and 132. It should be appreciated that reflective surfaces 131 and 132 are different colors from one another and also different colors than reflective surface 115. For example, reflective surface 131 is a blue color and reflective surface 132 is a red surface. As such, light emitted by a photographic light source is blue when it reflects off of reflective surface 131 and is a red color when it reflects off of reflective surface 132.

In another embodiment, cover 130 is a light absorbing cover. For example, cover 130 is a black material. As such, cover 130 absorbs the emitted light from the photographic light source.

Base portion 120 includes elastic portion 122. Base portion 120 is configured to releasably couple device 100A to object 125. In one embodiment, base portion 120 comprises the same material as formable portion 110. In another embodiment, base portion 120 is inelastic.

Object 125 can be any object that device 100A is able to attach to in a photographic environment. Object 125 can be a light stand, photographic light source (e.g., strobe), etc.

In order to couple device 100A to object 125, base portion 120 is wrapped around object 125 and secured by a fastener. In one embodiment, hook portion 124 of the hook and loop fastener is at attached to loop portion 126 of the hook and loop fastener. Moreover, elastic portion 122 is able to generate tension to increase the coupling force of base portion 120 with respect to object 125.

The fastener can be any releasable fastener that facilitates in coupling base portion 120 to object 125. For example, the releasable fastener can be, but is not limited to, a hook and loop fastener, snaps, etc.

Base portion 120 also includes friction enhancing surface 128. Friction enhancing surface 128 is for enhancing the friction between base portion 120 and object 125. Friction enhancing surface 128 is comprised of a material with a high coefficient of friction. For example, friction enhancing surface 128 is a rubber-like material with small protrusions that facilitate in increasing the friction between base portion 120 and object 125.

Device 100A includes border 112. Border 112 is disposed along the perimeter of device 100A. For instance, border 112 extends along the perimeter of formable portion 110 and base portion 120. Border 112, among other things, creates a protective edge around device 100A.

Figure 6:
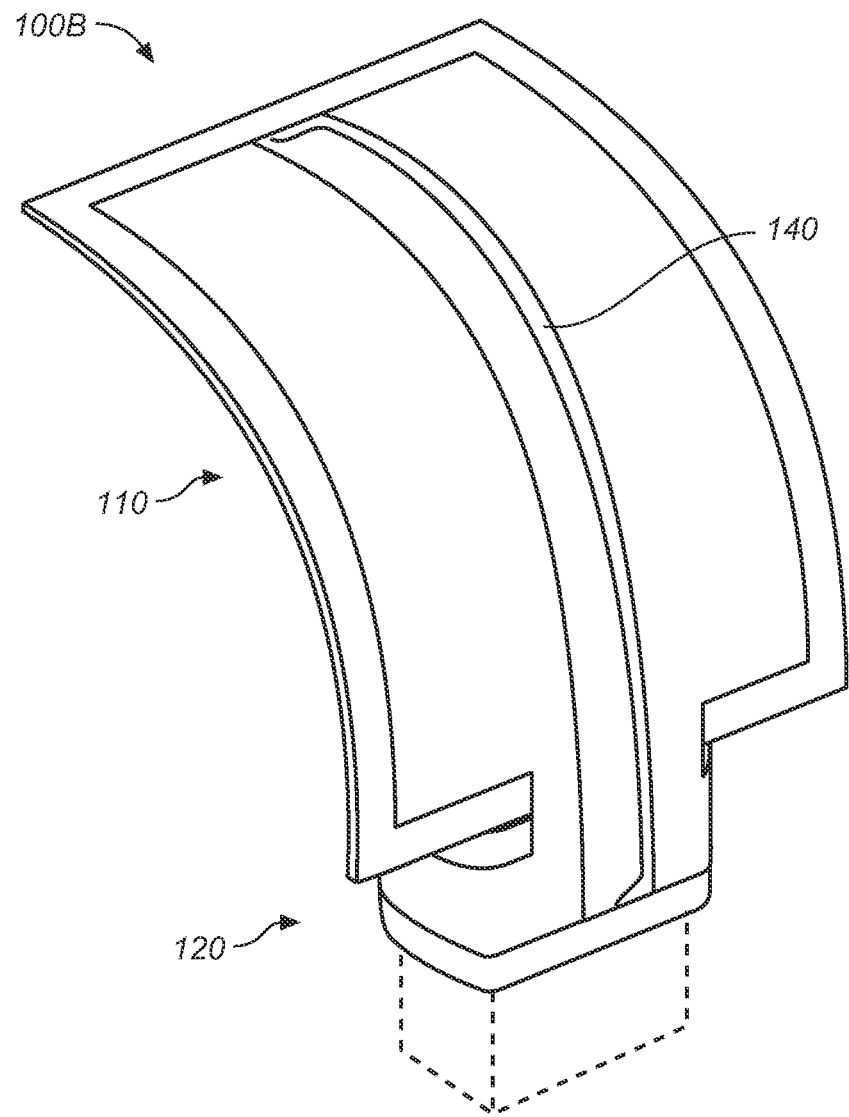
Figure 7:
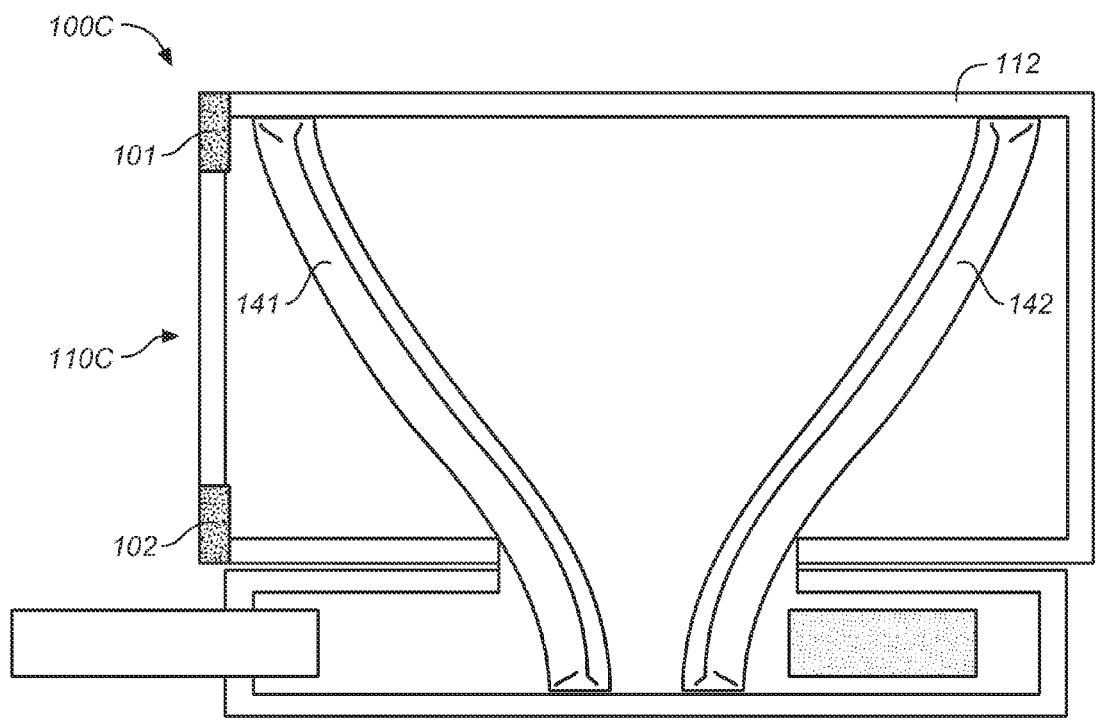
Figure 8:
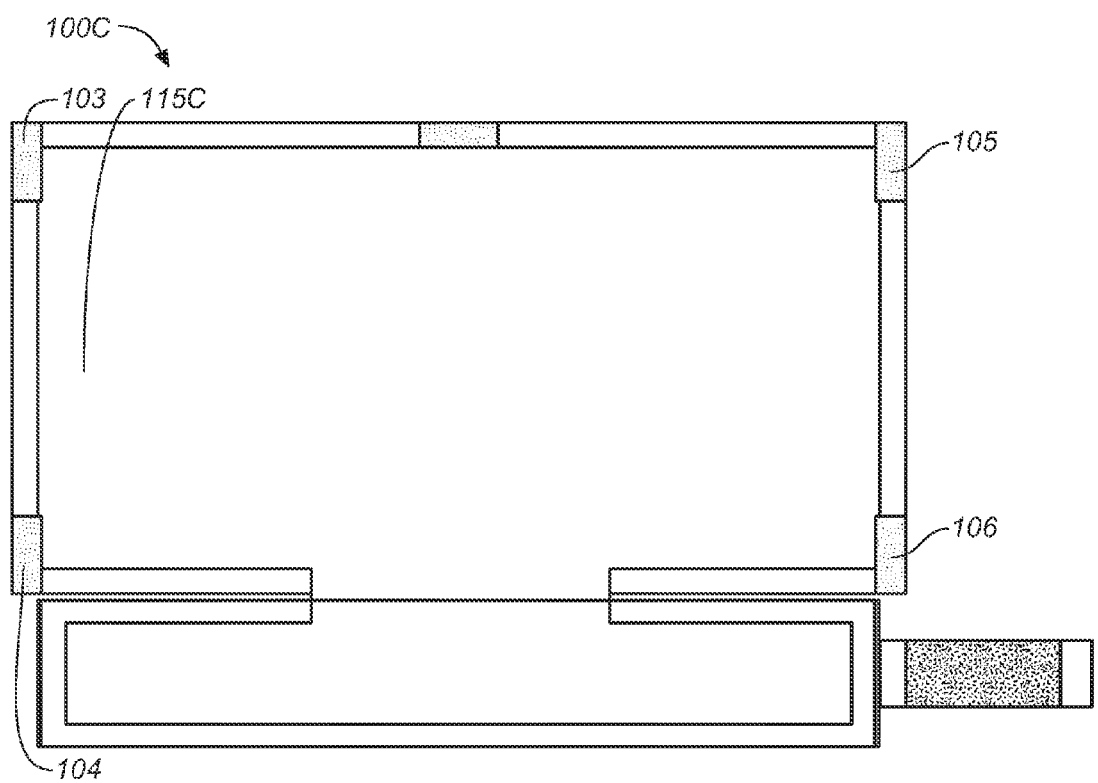

FIGS. 5 and 6 depict embodiments of device 100B. Device 100B is similar to device 100A and operates in a similar fashion to device 100A. However, device 100B includes formable rod 140 disposed on a surface opposite reflective surface 115.

Formable rod 140 is configured to retainably form formable portion 110 into a plurality of shapes. Accordingly, reflective portion 115 is able to be retainably formed into a plurality of shapes based on the shape that formable rod 140 is formed into.

Referring to FIG. 6, formable rod 140 is formed to have a curve, as depicted. Accordingly, reflective portion 115 of formable portion 110 is curved based on the curvature of formable rod 140. Moreover, the shape of reflective portion is retained until a user forms formable rod 140 into another desired shape.

Formable rod 140 is disposed along the length of device 100B. For example, formable rod 140 extends from a top portion of formable portion 110 to a bottom portion of base portion 120. In one embodiment, formable rod 140 extends from border 112 of formable portion 110 to border 112 of base portion 120.

Formable rod 140 also allows device 100B to be rigid and/or upright with respect to object 125. In other words, formable rod 140 acts as a spine for device 100B, such that device 100B is able to be retainably rigid and/or upright with respect to object 125.

In one embodiment, formable rod 140 is disposed within a sleeve that is attached to formable portion 110. As such, the sleeve is a protective and/or retaining means for formable rod 140.

Although device 100B is depicted as including one formable rod. It should be appreciated that device 100B can include any number of formable rods.

FIGS. 7-10 depict embodiments of device 100C. Device 100C is similar devices 100A-B and operates in a similar fashion to devices 100A-B.

However, device 100C includes formable rods 141 and 142 disposed on a surface opposite reflective surface 115. Moreover, device 100C includes a formable portion 110C that is wider than formable portion 110. Likewise, reflective surface 115C is wider than reflective surface 115.

Formable rods 141-142 are similar to formable rod 140. For example, formable rods 141-142 are configured to retainably form formable portion 110C into a plurality of shapes. Accordingly, reflective portion 115C is able to be retainably formed into a plurality of shapes based on the shape that formable rods 141-142 are formed into.

Formable rods 141-142 are disposed along the length of device 100C. For example, formable rods 141-142 extend from a top portion of formable portion 110C to a bottom portion of base portion 120.

In one embodiment, formable rods 141-142 extend from border 112 of bottom portion 120 to border 112 near the upper corners of formable portion 110C. In other words, formable rods 141-142 extend to a top portion of formable portion 110C and lateral peripheries of formable portion 110C.

Although device 100C is depicted as including two formable rods. It should be appreciated that device 100C can include any number of formable rods.

Figure 10:
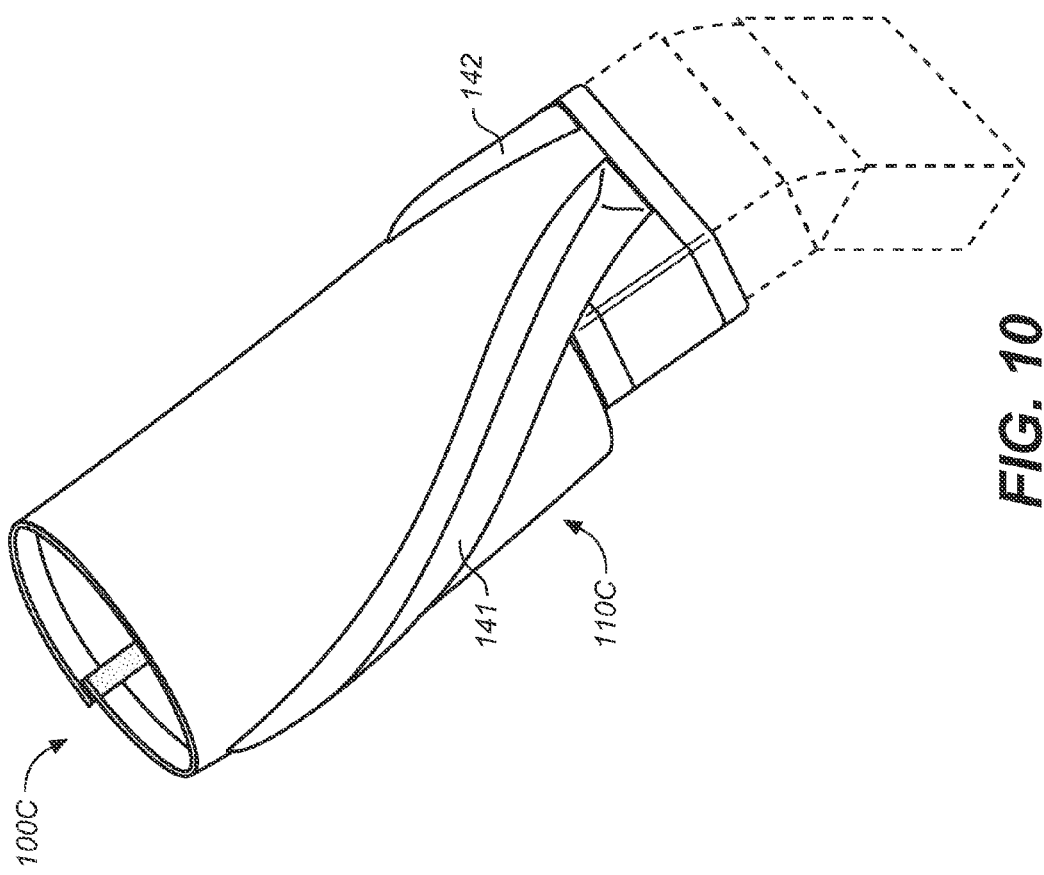

In various embodiments, device 100C includes fasteners 101-106. Fasteners 101-102 are associated with fasteners 103-104 to facilitate in forming formable portion 110C into cylinder or snoot, as depicted in FIG. 10. Fasteners 103-106 are associated with fasteners of cover 130, which is described in detail above. Fasteners 101-106 can be, but are not limited to, hook and loop fasteners, snaps, adhesive, etc.

Figure 9:
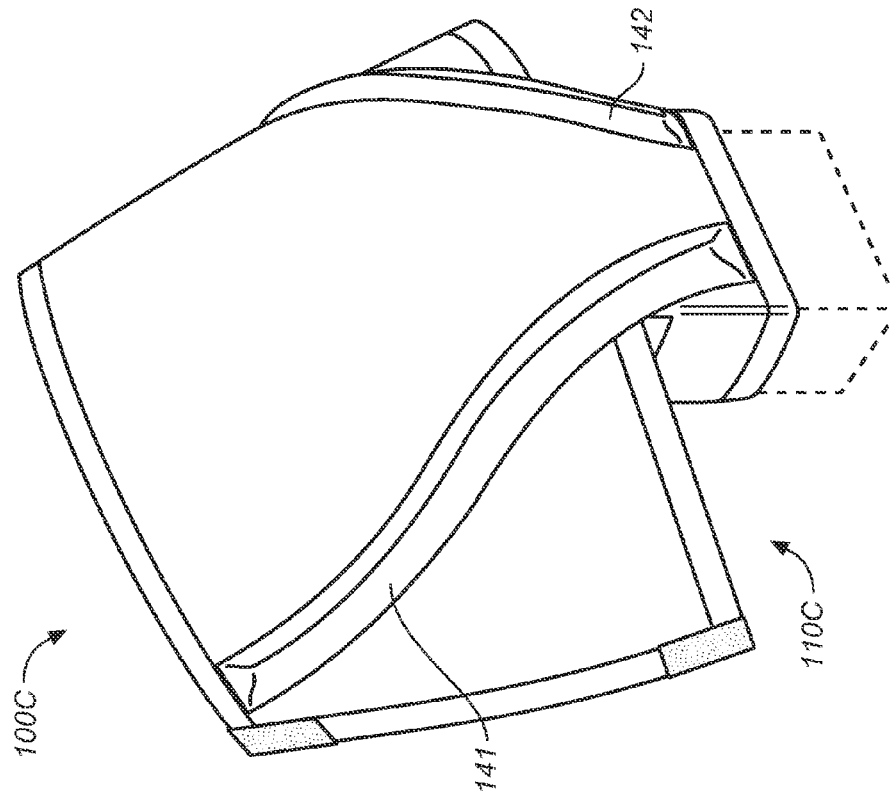

FIGS. 9 and 10 depict various shapes of formable portion 110C. In particular, FIG. 9 depicts formable portion 110C formed into a shape of a parabola.

FIG. 10 depicts formable portion 110C formed into a shape of a cylinder or snoot. In this embodiment, object 125 is a photographic light source. As such, light emitted by object 125 is directed through the snoot formed by formable portion 110C. The snoot can include various photographic devices, such as, but not limited to, filters, grids, etc.

Figure 11:
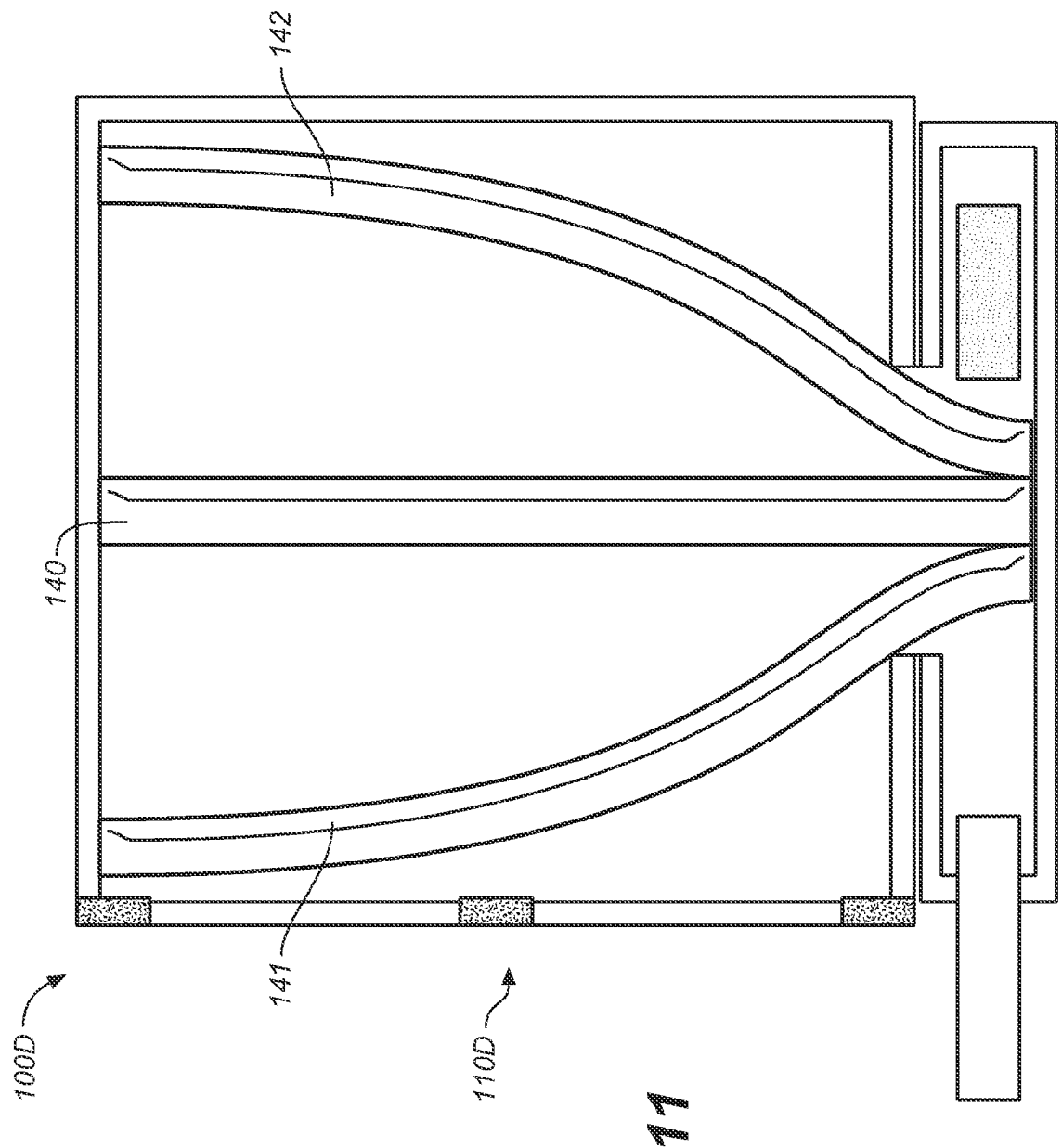

FIG. 11 depicts an embodiment of device 100D. Device 100D is similar devices 100A-C and operates in a similar fashion to devices 100A-C. However, device 100D includes formable rods 140-142. Formable rods 140-142 are described in detail above.

In particular, formable rods 140-142 are configured to retainably form formable portion 110D into a plurality of shapes. Accordingly, a reflective portion (not shown) is able to be retainably formed into a plurality of shapes (e.g., parabola, cylinder, etc.) based on the shapes that formable rods 140-142 are formed into.

Although device 100D is depicted as including three formable rods. It should be appreciated that device 100D can include any number of formable rods.

Figure 12:
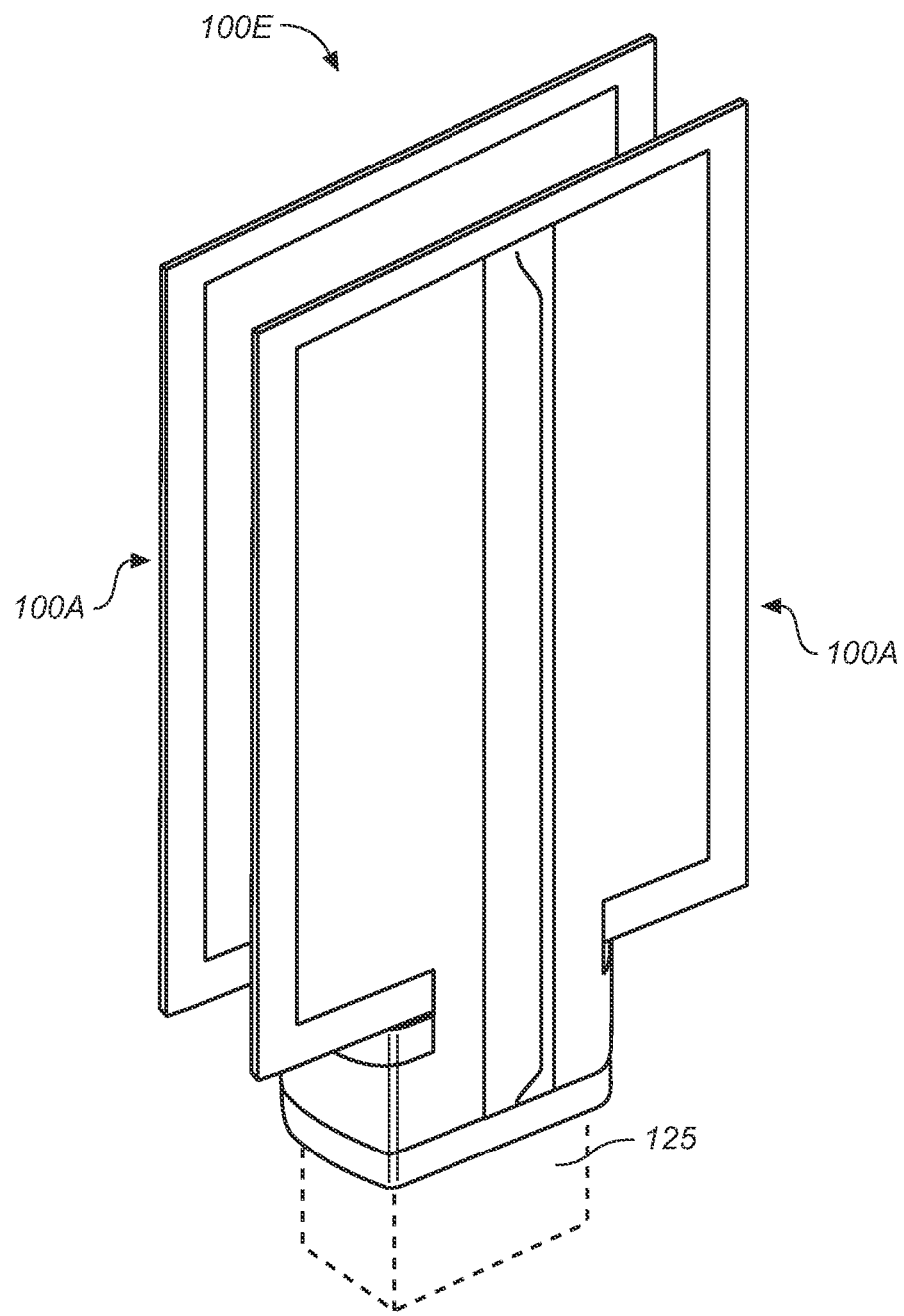

FIG. 12 depicts an embodiment of system 100E. System 100E includes a combination of at least two devices, such as a combination at least two devices 100A. It should be appreciated that any combination of devices 100A-D can be utilized.

System 100E is also known as a barn door. In general, a barn door allows to shape or control light. As such, light emitted from object 125 is shaped or controlled by the shapes and/or positions of devices 100A with respect to each other. For example, as formable portions 110 are spread apart from one another, the greater the amount of light from object 125 that is emitted onto or towards a photographic subject. In contrast, as formable portions 110 are moved towards one another, less amount of light from object 125 is emitted onto or towards a photographic subject.

It should be appreciated that any number of devices can be associated with one another to form a barn door. For example, four devices can be utilized to shape or control light emitted from object 125.

Figure 13:
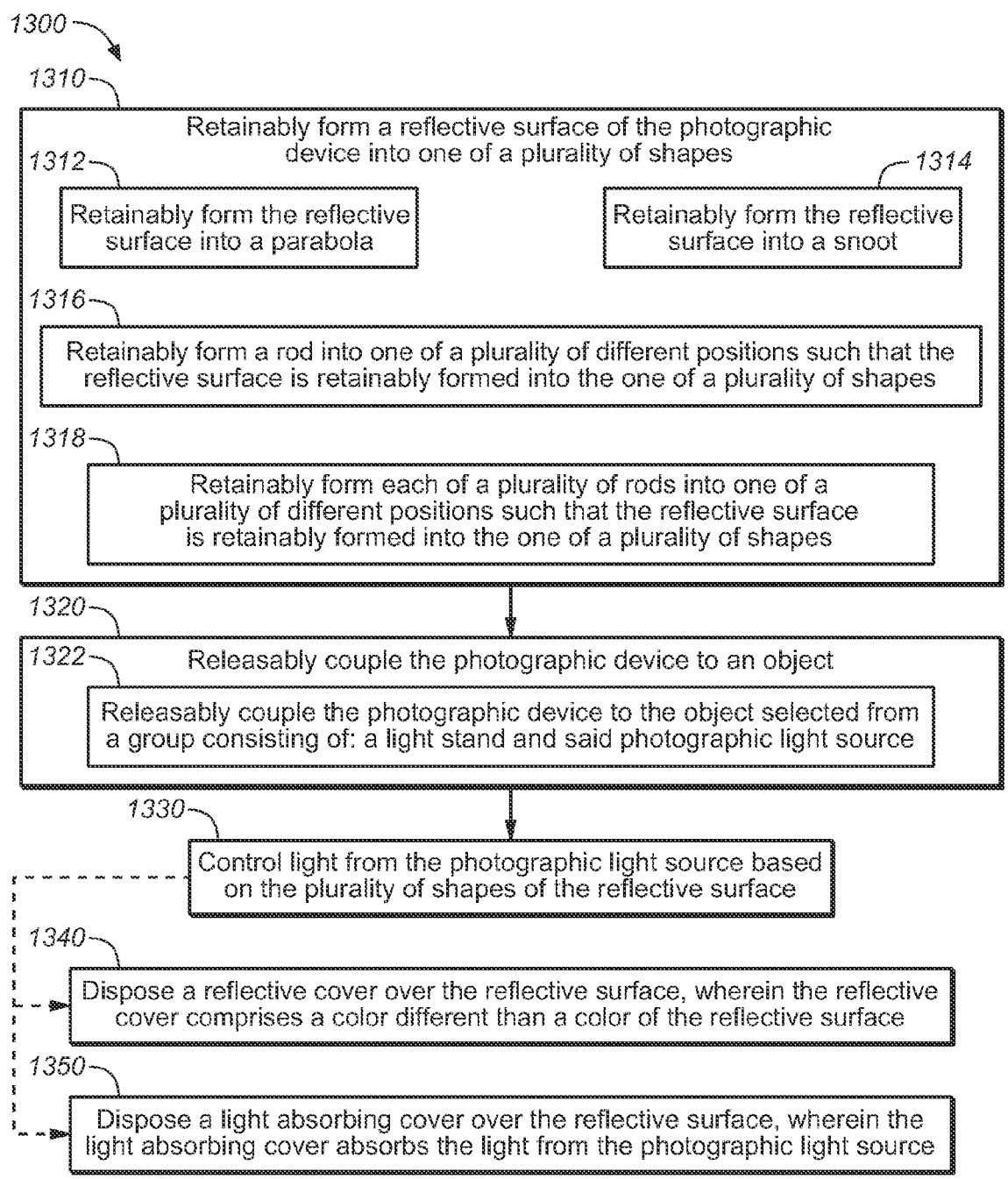
FIG. 13 illustrates a method for retainably forming a shape of a photographic device, in accordance with embodiments of the present invention.

FIG. 13 depicts a method 1300 for retainably forming a shape of a photographic device. In some embodiments, method 1300 is performed at least by devices 100A-D, as described in FIGS. 1-12.

At 1310 of method 1300, a reflective surface of the photographic device is retainably formed into one of a plurality of shapes. For example, reflective surface 115 of any of devices 100A-D is retainably formed into one of a plurality of different shapes.

In one embodiment, at 1312, the reflective surface is retainably formed into a parabola, as depicted in FIG. 9. In another embodiment, at 1314, the reflective surface is retainably formed into a snoot, as depicted in FIG. 10.

In one embodiment, at 1316, a rod is retainably formed into one of a plurality of different positions such that the reflective surface is retainably formed into the one of a plurality of shapes. For example, rod 140 is retainably formed into a curve such that reflective surface 115 is retainably formed into the curve shape of rod 140.

In another embodiment, at 1318, each of a plurality of rods are retainably formed into one of a plurality of different positions such that the reflective surface is retainably formed into the one of a plurality of shapes. For example, rods 140-142 are retainably formed into desired shapes such that reflective surface 115 is retainably formed into a snoot.

At 1320, the photographic device is releasably coupled to an object. For example, device 100C is releasably coupled to object 125 via base portion 120. In one embodiment, at 1322, the object is selected from a group consisting of a light stand and a photographic light source (e.g., strobe).

In one embodiment, at 1330, light from the photographic light source is controlled based on the plurality of shapes of the reflective surface. For example, a snoot directs the light from the light source to the distal end of the snoot.

In another embodiment, at 1340, a reflective cover is disposed over the reflective surface, wherein the reflective cover comprises a color different than a color of the reflective surface. For example, cover 130, having an orange color, is disposed over a reflective surface of device 100D.

In a further embodiment, at 1350, a light absorbing cover is disposed over the reflective surface, wherein the light absorbing cover absorbs the light from the photographic light source. For example, cover 130, having a black color, is disposed over the reflective surface of device 100D, to reduce the amount of light reflected towards a photographic subject.

Figure 14:
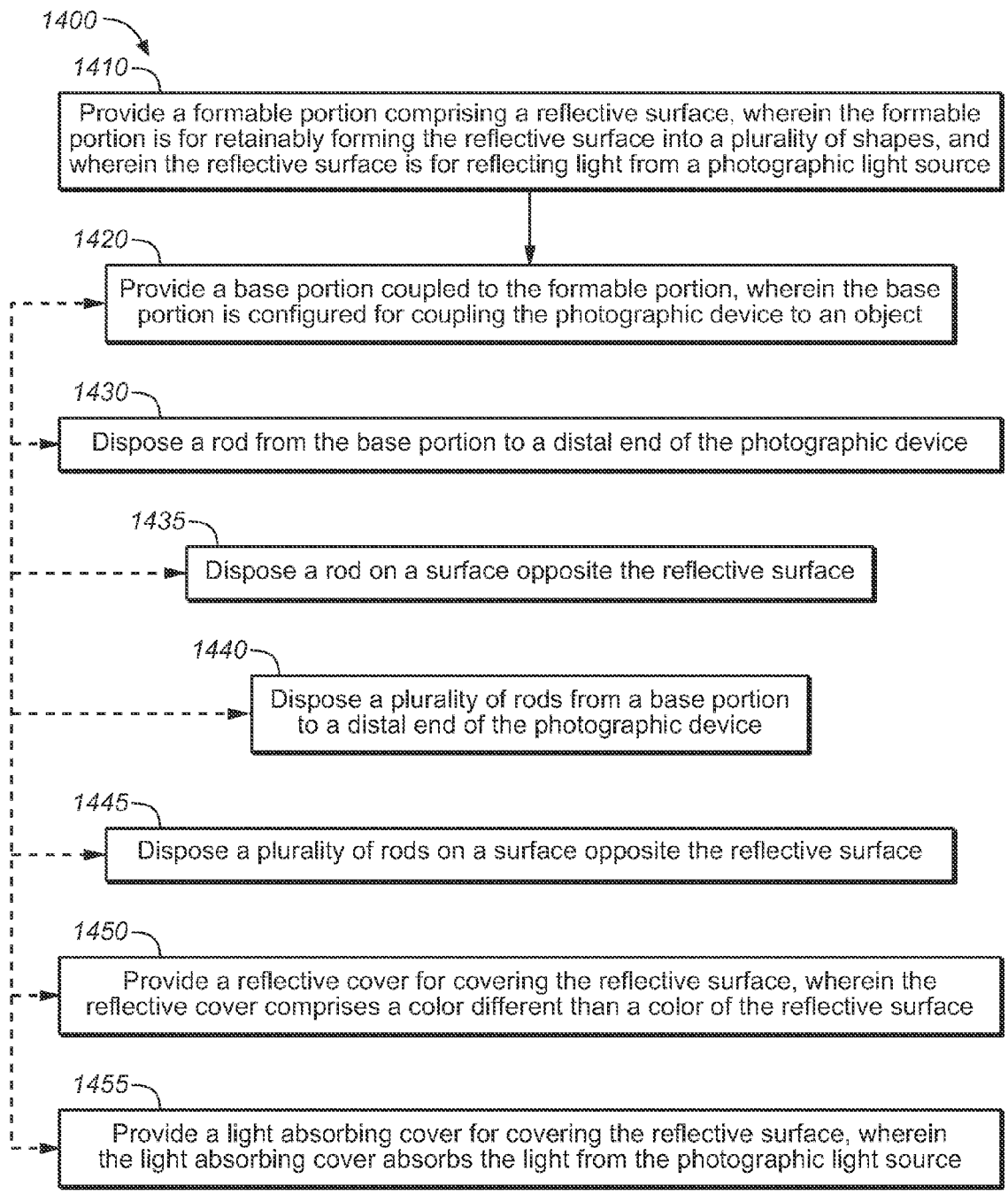
FIG. 14 illustrates a method for forming a formable photographic device, in accordance with an embodiment of the present invention.

FIG. 14 depicts a method 1400 for retainably forming a shape of a photographic device. In some embodiments, method 1400 is performed at least by devices 100A-D, as described in FIGS. 1-12.

At 1410 of method 1400, a formable portion is provided comprising a reflective surface, wherein the formable portion is for retainably forming the reflective surface into a plurality of shapes, and wherein the reflective surface is for reflecting light from a photographic light source.

At 1420, a base portion is provided coupled to the formable portion, wherein the base portion is configured for coupling the photographic device to the object.

At 1430, a rod is disposed from the base portion to a distal end of the photographic device. For example, rod 140 is disposed from base portion 120 to a distal end of device 1008.

At 1435, a rod is disposed on a surface opposite the reflective surface.

At 1440, a plurality of rods are disposed from a base portion to a distal end of the photographic device. At 1445, a plurality of rods are disposed on a surface opposite the reflective surface.

At 1450, a reflective cover is provided for covering the reflective surface, wherein the reflective cover comprises a color different than a color of the reflective surface. At 1455, a light absorbing cover is provided for covering the reflective surface, wherein the light absorbing cover absorbs the light from the photographic light source.

Embodiments of Light Grids and Bezel

Figure 15:
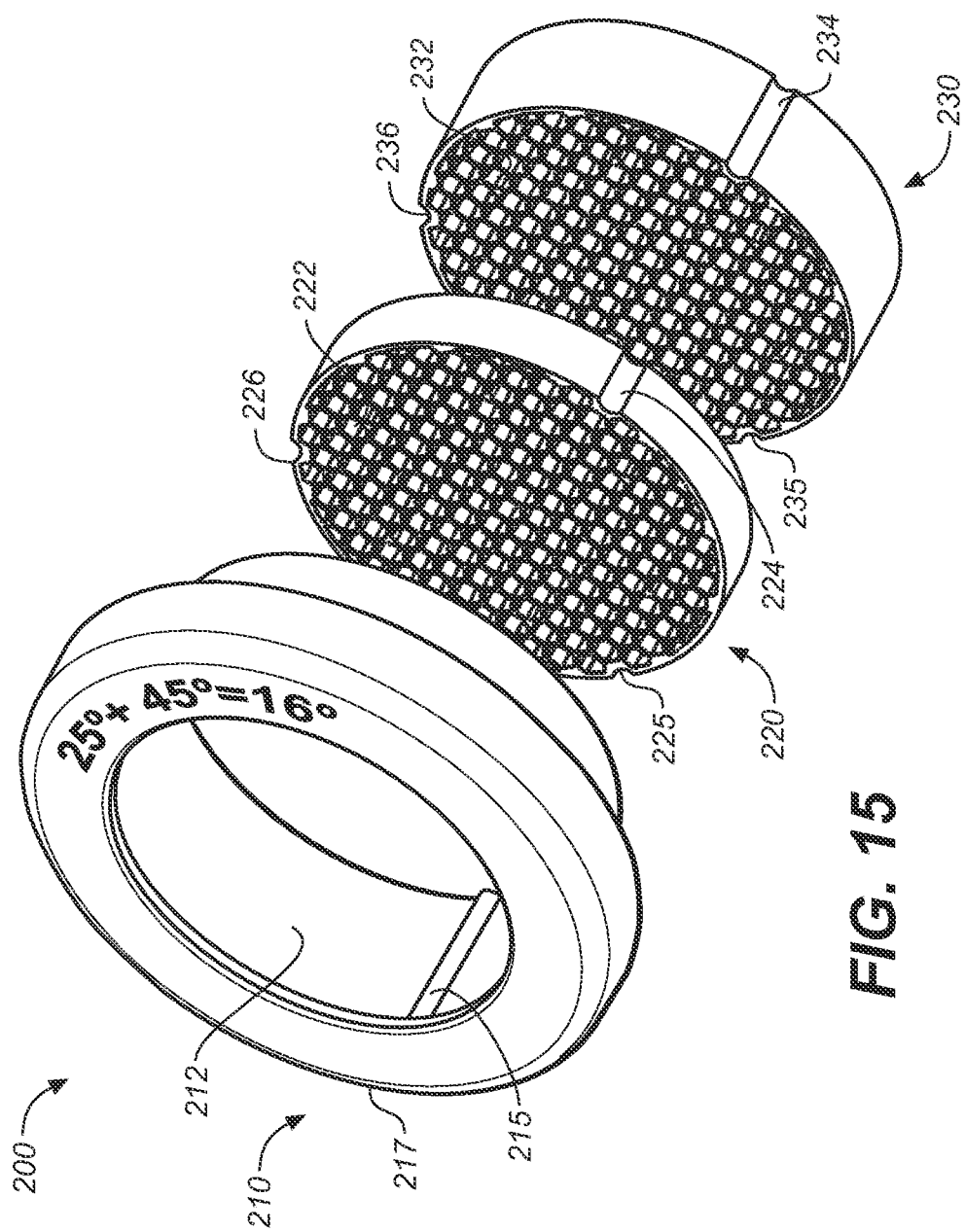
FIG. 15 illustrates a bezel/grid system, in accordance with an embodiment of the present invention.

FIG. 15 depicts an embodiment of system 200. System 200 includes bezel 210, light grid 220 and light grid 230.

Light grid 220 includes a plurality of cells 222 and alignment features 224-226.

Cells 222 are configured to control light through light grid 220 such that light is emitted out of grid 220 at a specific angle. In one embodiment, light grid 220 is 45 degree light grid. Accordingly, light is emitted out of grid 220 at a 45 degree angle.

Cells 222 are hexagonal cells. Hexagonal cells or honeycomb-shaped cells are the most efficient shaped cells to allow light through. As such, more light is able to transmit through hexagonal cells 222 than cylindrical cells.

Alignment features 224-226 are for aligning with bezel 210. Alignment features 224-226 are disposed on the outer surface or periphery of light grid 220. Accordingly, no light is blocked by alignment features 224-226.

Alignment features 224-226 are channels disposed along the length of light grid 220. However, alignment features 224-226 can be any alignment means (e.g. protrusion) that is capable with aligning with bezel 210. It should also be appreciated that at least one alignment feature is disposed on the outer surface of light grid 220.

Light grid 230 is similar to and operates in a similar fashion as light grid 220. However, light grid 230 is a 25 degree light grid.

Light grid 230 includes cells 232 and alignment features 234-236, similar to light grid 220. In one embodiment, cells 232 are hexagonal cells.

A combination of light grid 220 and 230 generates a 16 degree light grid. Therefore, three light grid angles can be generated by utilizing two light grids.

Figure 16:
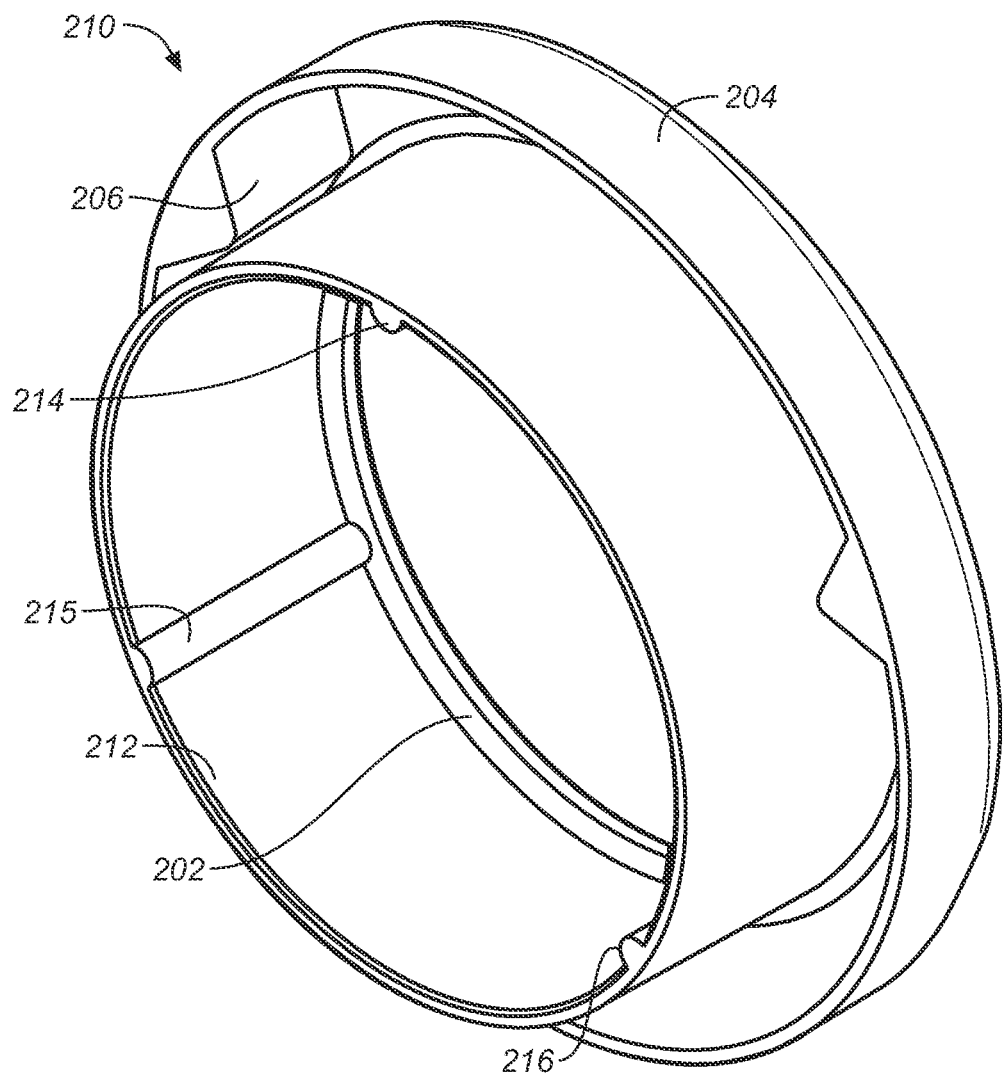
FIG. 16 illustrates a bezel, in accordance with an embodiment of the present invention.

Referring to FIGS. 15 and 16, bezel 210 is configured for aligning and retaining light grids 220 and 230. Bezel 210 includes retainer 212 and alignment features 214-216.

Retainer 212 is for retaining light grids 220 and 230. In particular, to retain light grid 220, alignment features 224-226 are aligned with alignment features 214-216, and light grid 220 is inserted into retainer until light grid seats with ring 202. Additionally, the outer circumference of light grid 220 is substantially equal to the inner circumference of retainer 212. Therefore, light grid 220 is frictionally fit within retainer 212.

Similarly, to retain light grid 230, alignment features 234-236 are aligned with alignment features 214-216, and light grid 230 is inserted into retainer until light grid seats with ring 202. Additionally, the outer circumference of light grid 230 is substantially equal to the inner circumference of retainer 212. Therefore, light grid 230 is frictionally fit within retainer 212.

Alignment features 214-216 are protrusions disposed along the length of retainer 212. However, alignment features 214-216 can be any alignment means (e.g. channels) that is capable for aligning light grids 220 and/or 230 within bezel 210. It should also be appreciated that at least one alignment feature is disposed on the inner periphery of bezel 210.

In one embodiment, both light grids 220 and 230 are retained in combination within retainer 212. Due to the alignment features of bezel 210, light grids 220 and 230, cells 222 of light grid 220 are aligned with cells 232 of light grid 230. As such, the combination of light grids 220 and 230 creates a 16 degree light grid.

Light grids 220 and 230 are molded light grids.

FIG. 15 depicts light grid 220 inserted into retainer 212 before light grid 230. However, light grid 230 can be inserted into retainer 212 before light grid 220 to generate a 16 degree light grid.

A length (or depth) of retainer 212 is substantially equal to the length (or depth) of the combination of light grids 220 and 230.

Bezel 210 includes indicia 217. Indicia 217 indicates a resulting grid angle of a combination of a grid angle of a first light grid and a grid angle of a second light grid. In particular, indicia 217 indicates that a 25 degree light grid plus a 45 degree light grid equals a 16 degree light grid.

In various embodiments, system 200 includes a light filter (e.g. filter 250 depicted in FIG. 19) disposed within retainer 212. For instance, a light filter is disposed between (1) bezel 210 and either light grid 220 or light grid 230, or (2) light grid 220 and light grid 230. It should be appreciated that the light filter can be any color.

Bezel 210 is also configured for being retained by a snoot. Moreover, an outer periphery 204 includes at least one retaining feature 206 for retaining the snoot, which will be described in detail below.

Figure 17:
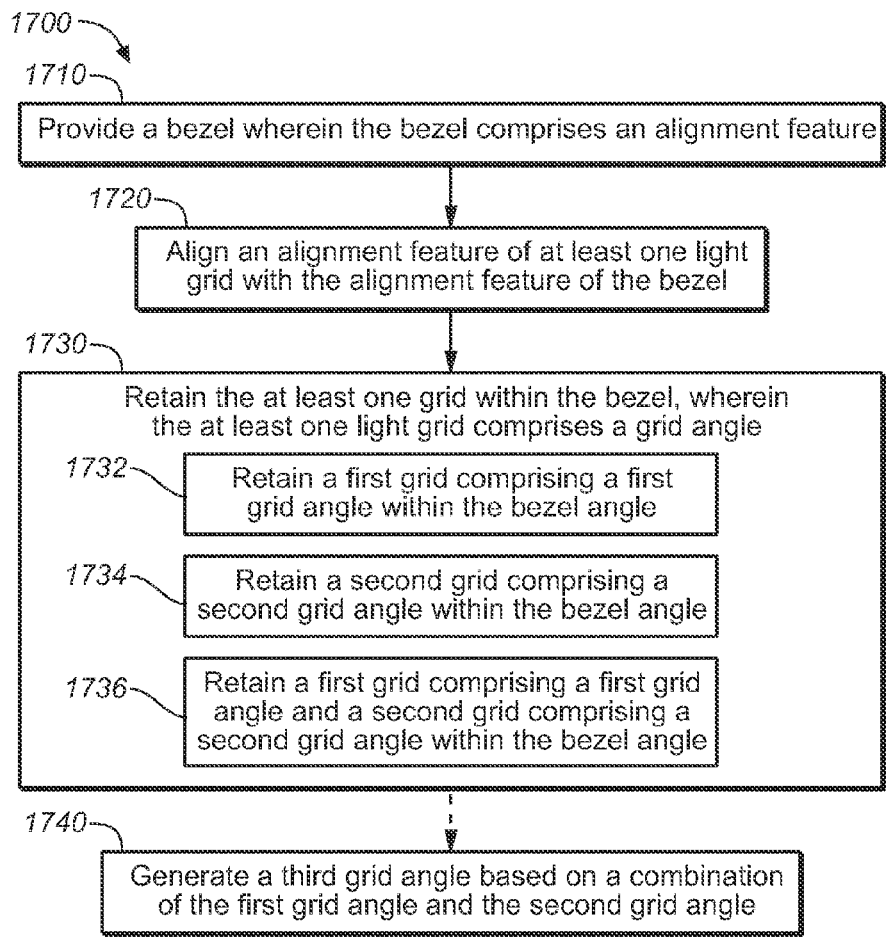
FIGS. 17 and 20 illustrate methods of utilizing grid angles of two light grids to generate a third desirable grid angle, in accordance with embodiments of the present invention.

FIG. 17 depicts a method 1700 of utilizing grid angles of two light grids to generate a third desirable grid angle. In some embodiments, method 1700 is performed at least by system 200, as described in FIG. 15.

At 1710 of method 1700, a bezel is provided, wherein the bezel comprises an alignment feature. For example, bezel 210 is provided, wherein the bezel includes at least one alignment feature.

At 1720, an alignment feature of at least one light grid is aligned with the alignment feature of the bezel. For example, alignment feature 224 of light grid 220 is aligned with alignment feature 214 of bezel 210.

At 1730, the at least one grid is retained within the bezel, wherein the at least one light grid comprises a grid angle. In one embodiment, at 1732, a first grid (e.g., light grid 220) comprising a first angle (e.g., a 45 degree angle) is retained within the bezel. In another embodiment, at 1734, a second grid (e.g., light grid 230) comprising a second grid angle (e.g., a 25 degree angle) is retained within the bezel. In a further embodiment, at 1736, a first grid comprising a first grid angle and a second grid comprising a second grid angle are retained within the bezel.

At 1740, a third grid angle based on a combination of the first grid angle and the second grid angle is generated. For example, a 16 degree light grid is generated based on a combination of 45 degree light grid and a 25 degree light grid.

Figure 18:
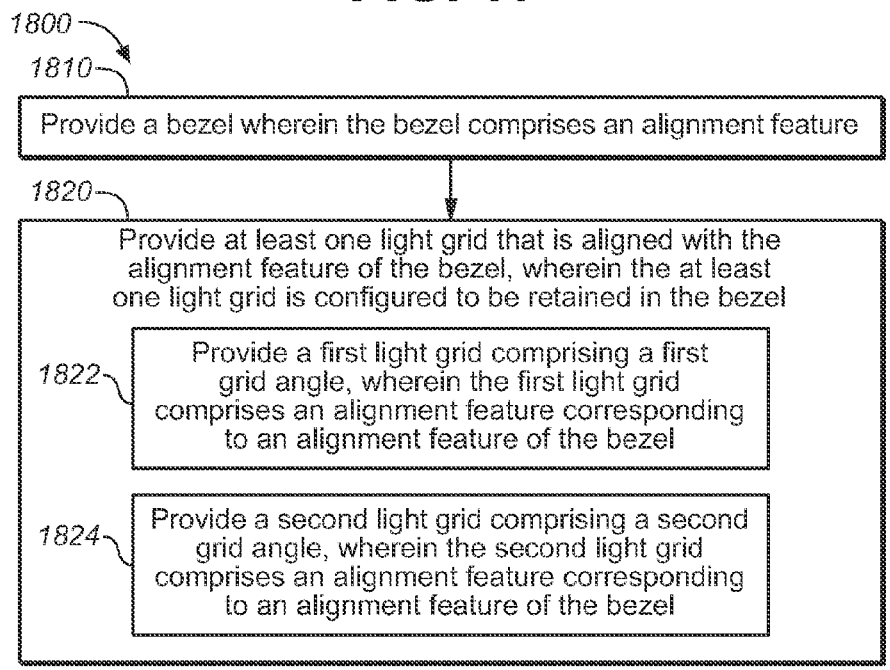
FIGS. 18 and 21 illustrate methods for forming a photographic system, in accordance with a embodiments of the present invention.

FIG. 18 depicts a method 1800 for forming a photographic system. In some embodiments, method 1800 is performed at least by system 200, as described in FIG. 15.

At 1810 of method 1800, a bezel is provided, wherein the bezel comprises an alignment feature.

At 1820, provide at least one light grid that is aligned with the alignment feature of the bezel, wherein the at least one light grid is configured to be retained in the bezel.

In one embodiment, at 1822, a first light grid comprising a first grid angle is provided, wherein the first light grid comprises an alignment feature corresponding to an alignment feature of the bezel. In another embodiment, at 1824, a second light grid comprising a second grid angle is provided, wherein the second light grid comprises an alignment feature corresponding to an alignment feature of the bezel.

Embodiments of a Combination of Light Grids, Bezel and Formable Reflector

Figure 19:
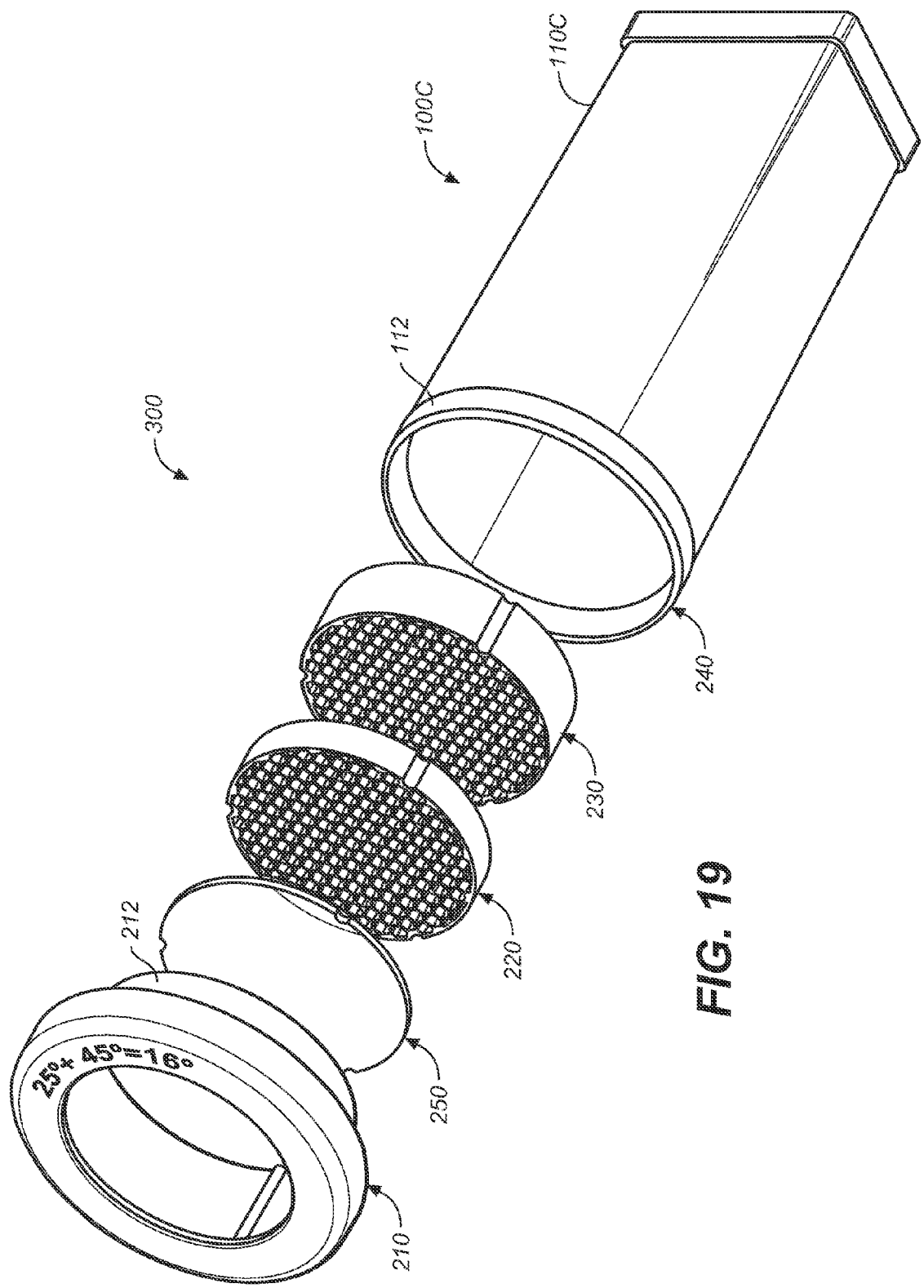
FIG. 19 illustrates a photographic system, in accordance with an embodiment of the present invention.

FIG. 19 depicts an embodiment of system 300. System 300 includes system 200, depicted in FIG. 15, and device 100C (or 100D).

Device 100C is photographic device in the shape of a snoot, as depicted in FIG. 10. In particular, formable portion 110C is formed into a snoot, as described in detail above.

Device 100C is configured to receive bezel 210 and light grids 220 and/or 230. In particular, retainer 212 is received by a distal end 240 of formable portion 110C. Accordingly, light emitted by object 125 travels through device 100C and through light grids 220 and/or 230.

Referring to FIGS. 15, 16 and 19, bezel 210 is retained to device 100C by formable portion 110C being formed around retainer 212. In other words, distal end 240 of formable portion 110C is wrapped around retainer 212 and fastened in place by releasable fasteners, such as a hook and loop fastener. Therefore, there is a friction fit between the outer surface of retainer 212 and distal end 240 of formable portion 110C.

It should be appreciated that the width of formable portion 110C is substantially equal to the outer circumference of retainer 212. In another embodiment, bezel 210 includes an elastic feature (e.g., a rubber band) that wraps around distal end 240 of formable portion 110C to further secure distal end 240 to retainer 212.

Bezel 210 is further retained to device 100C by at least one retaining portion 206. In one embodiment, retaining portion 206 is disposed on an inner surface of outer periphery 204 of bezel 210. Specifically, retaining portion 206 resiliently retains border 112. In one embodiment, a width of border 112 substantially equals the length (or depth) of outer periphery 204 and/or retaining portion 206.

For example, border 112 slides between retaining portion 206 and an outer surface of retainer 212 and is subsequently resiliently retained between retaining portion 206 and the outer surface of retainer 212.

In various embodiments, bezel 210 can include any number of retaining portions for resiliently retaining device 100C with bezel 210. Moreover, retaining portions can be any shape and/or configuration that allows for resiliently retaining device 100C with bezel 210.

Figure 20:
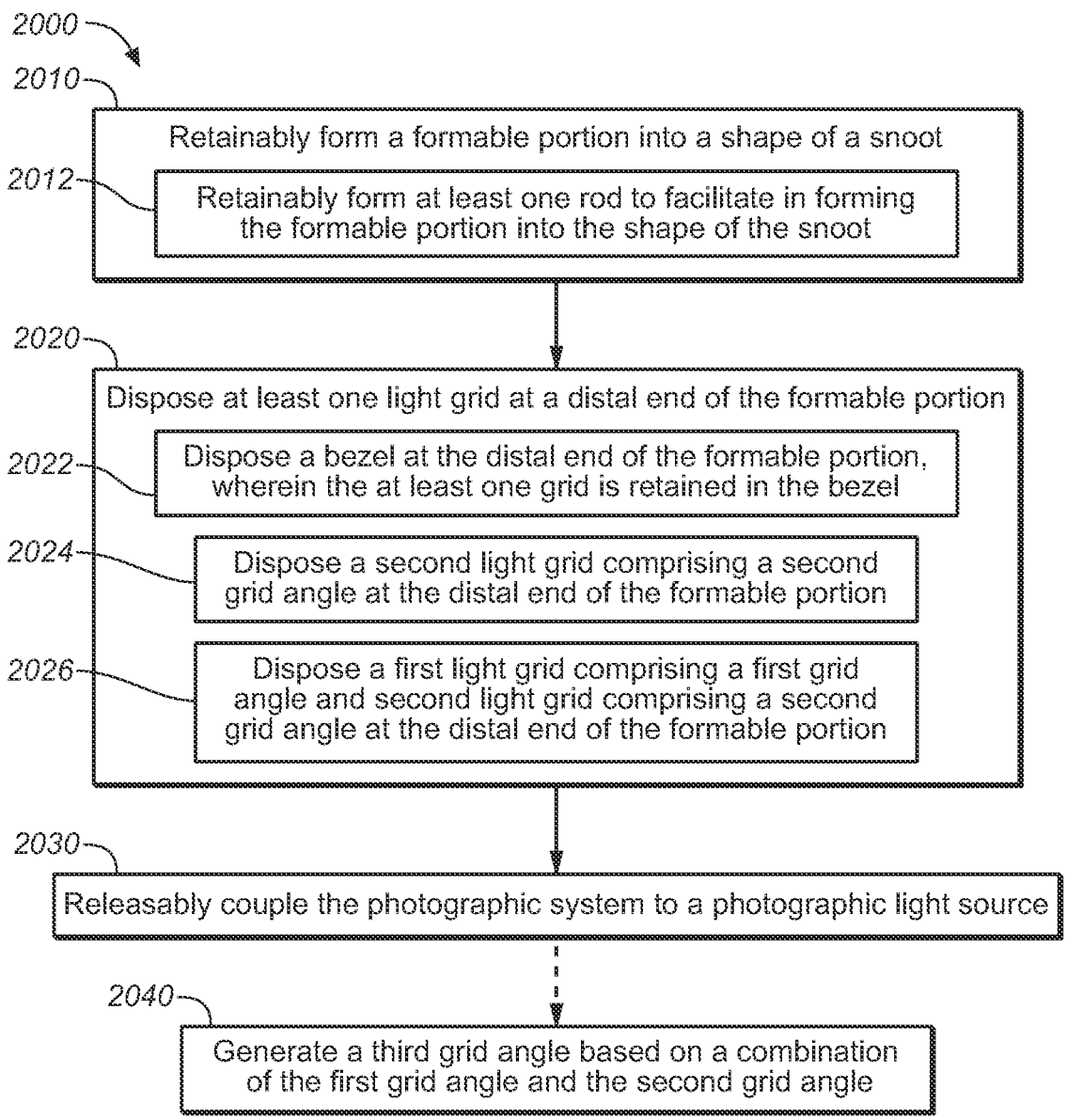

FIG. 20 depicts a method 2000 of utilizing grid angles of two light grids to generate a third desirable grid angle. In some embodiments, method 2000 is performed at least by system 300, as described in FIG. 19.

At 2010 of method 2000, a formable portion is retainably formed into a shape of a snoot. In one embodiment, at 2012, at least one rod is retainably formed to facilitate in forming the formable portion into the shape of the snoot.

At 2020, at least one light grid is disposed at a distal end of the formable portion. In one embodiment, at 2022, a bezel is disposed at the distal end of the formable portion, wherein the at least one grid is retained in the bezel. In another embodiment, at 2024, a second light grid comprising a second grid angle is disposed at the distal end of the formable portion. In a further embodiment, at 2026, a first light grid comprising a first grid angle and second light grid comprising a second grid angle are disposed at the distal end of the formable portion.

At 2030, the photographic system is releasably coupled to a photographic light source. In one embodiment, at 2040, a third grid angle is generated based on a combination of the first grid angle and the second grid angle.

Figure 21:
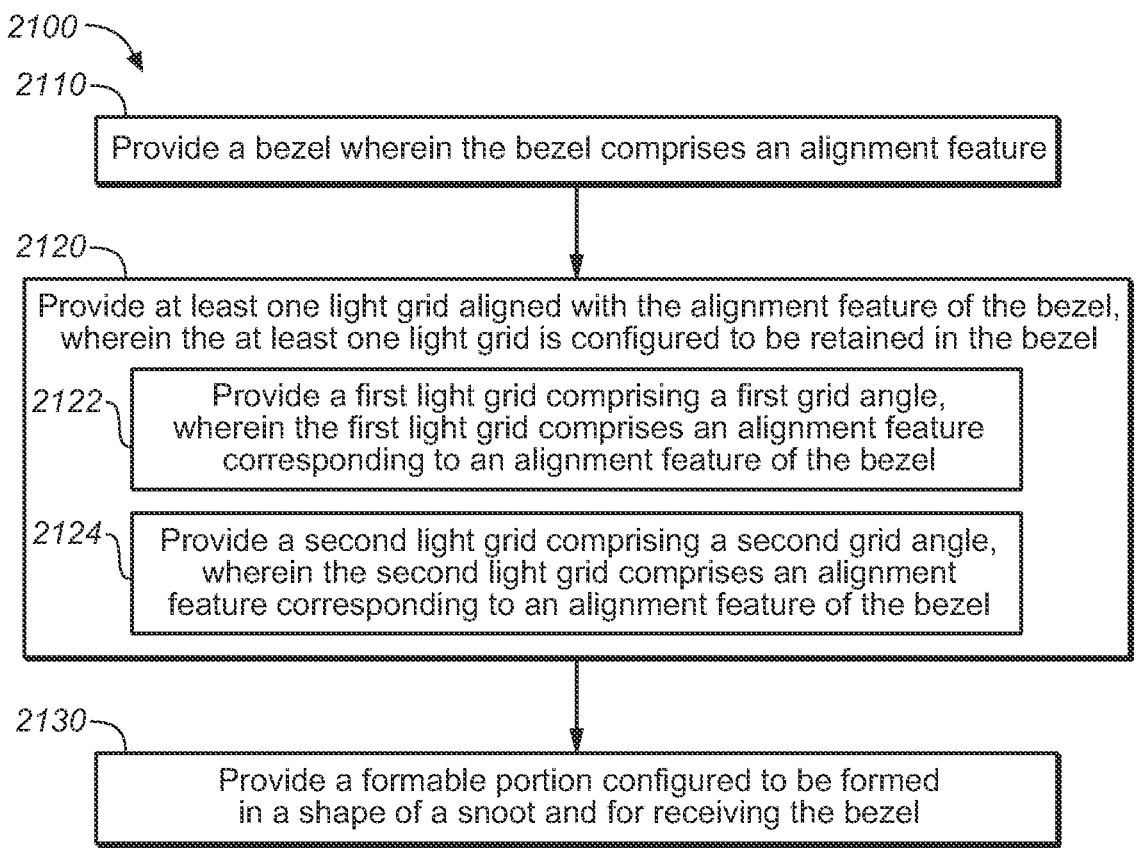

FIG. 21 depicts a method 2100 for forming a photographic system. In some embodiments, method 2100 is performed at least by system 300, as described in FIG. 19.

At 2110 of method 2100, a bezel is provided, wherein the bezel comprises an alignment feature.

At 2120, at least one light grid aligned with the alignment feature of the bezel is provided, wherein the at least one light grid is configured to be retained in the bezel. In one embodiment, at 2122, a first light grid comprising a first grid angle is provided, wherein the first light grid comprises an alignment feature corresponding to an alignment feature of the bezel. In another embodiment, at 2124, a second light grid comprising a second grid angle is provided, wherein the second light grid comprises an alignment feature corresponding to an alignment feature of the bezel.

At 2130, a formable portion configured to be formed in a shape of a snoot and for receiving the bezel is provided.

Various embodiments of the present invention are thus described. While the present invention has been described in particular embodiments, it should be appreciated that the present invention should not be construed as limited by such embodiments, but rather construed according to the following claims.

The invention claimed is:

1. A photographic system comprising:
a first light grid comprising:
a plurality of cells; and
a first alignment feature disposed on said first light grid;
a bezel comprising:
a retainer for retaining at least said first light grid; and
an alignment feature for aligning at least said first light grid within said light grid retainer, wherein said first alignment feature aligns with said alignment feature of said bezel;
a formable portion comprising a reflective surface, wherein said formable portion is for retainably formed into a snoot, wherein said bezel is disposed at a distal end of said formable portion, and wherein said reflective surface is for reflecting light from a photographic light source within said formable portion; and
a base portion coupled to said formable portion, wherein said base portion is for coupling to said photographic light source.

2. The photographic system of claim 1, further comprising:
a second light grid comprising:
a plurality of cells; and
a second alignment feature disposed on said second light grid.

3. The photographic system of claim 2, wherein said second alignment feature is disposed on a periphery of said second light grid.

4. The photographic system of claim 2, wherein said second alignment feature aligns with said alignment feature of said bezel.

5. The photographic system of claim 2, wherein said plurality of cells of said second light grid align with said plurality of cells of said first light grid.

6. The photographic system of claim 2, wherein said second light grid is selected from a group consisting of: a 45 degree light grid and a 25 degree light grid.

7. The photographic system of claim 2, wherein said plurality of cells of said second light grid are a plurality of hexagonal cells.

8. The photographic system of claim 1, wherein said first alignment feature is disposed on a periphery of said first light grid.

9. The photographic system of claim 1, wherein said second light grid is coaxial with said first light grid within said retainer.

10. The photographic system of claim 1, wherein said first light grid is selected from a group consisting of: a 45 degree light grid and a 25 degree light grid.

11. The photographic system of claim 10, wherein said second grid is the other of said first light grid selected from a group consisting of: a 45 degree light grid and a 25 degree light grid, such that the combination of said first grid and said second grid results a 16 degree light grid.

12. The photographic system of claim 1, wherein said plurality of cells of said first light grid are a plurality of hexagonal cells.

13. The photographic system of claim 1, further comprising:
a lighting filter disposed within said retainer.

14. The photographic system of claim 1, wherein said formable portion is a fabric.

15. The photographic system of claim 1, wherein said reflective surface is neutral white.

16. The photographic system of claim 1, wherein said reflective surface comprises:
polyvinyl chloride (PVC).

17. The photographic system of claim 1, further comprising:
a formable rod for retainably forming said reflective surface into said snoot.

18. The photographic system of claim 17, wherein said formable rod extends from said base portion to a distal end of said formable portion.

19. The photographic system of claim 17, wherein said formable rod is coupled to a surface of said formable portion opposite said reflective surface.

20. The photographic system of claim 1, further comprising:
a plurality of formable rods for retainably forming said reflective surface into said plurality of shapes.

21. The photographic system of claim 20, wherein said plurality of formable rods extends from said base portion to a distal end of said formable portion.

22. The photographic system of claim 20, wherein at least one of said plurality of formable rods extend from said base portion to a lateral periphery of said formable portion.

23. The photographic system of claim 21, wherein said plurality of formable rods are coupled to a surface of said formable portion opposite said reflective surface.

24. The photographic system of claim 1, wherein said base portion further comprises:
a fastener for releasably fastening said base portion to said photographic light source.

25. The photographic system of claim 1, wherein said base portion further comprises:
an elastic feature for generating tension when said base portion is releasably coupled to said photographic light source.

26. The photographic system of claim 1, further comprising:
a reflective cover for covering said reflective surface, wherein said reflective cover comprises a color different than a color of said reflective surface.

27. The photographic system of claim 26, wherein said reflective cover further comprises:
a first reflective surface comprising a first color; and
a second reflective surface comprising a second color.

28. The photographic system of claim 1, further comprising:
a light absorbing cover for covering said reflective surface, wherein said light absorbing cover absorbs said light from said photographic light source.

29. The photographic system of claim 1, wherein said bezel further comprises:
a retaining feature disposed on a periphery of said bezel, wherein said retaining feature resiliently retains said formable portion around said retainer.

30. The photographic system of claim 1, wherein said bezel further comprises:
retaining features disposed on a periphery of said bezel, wherein said retaining features resiliently retain said formable portion around said retainer.

31. The photographic system of claim 1, wherein said bezel further comprises:
indicia indicating a resulting grid angle of a combination of a first grid angle of said first grid and a second grid angle of said second grid.

32. The photographic system of claim 1, wherein a circumference of said retainer is substantially equal to a length of said formable portion.

33. A method of utilizing grid angles of two light grids to generate a third desirable grid angle, said method comprising:
retainably forming a formable portion into a shape of a snoot;
disposing at least one light grid at a distal end of said formable portion, said light one grid comprising an alignment feature; and
releasably coupling said photographic system to a photographic light source, said alignment feature enabling proper alignment between said one light grid and said distal end of said formable portion.

34. The method of claim 33, wherein said retainably forming a formable portion into a shape of a snoot comprises:
retainably forming at least one rod to facilitate in forming said formable portion into said shape of said snoot.

35. The method of claim 33, wherein said disposing at least one light grid at a distal end of said formable portion further comprises:
disposing a bezel at said distal end of said formable portion, wherein said at least one grid is retained in said bezel.

36. The method of claim 33, wherein said disposing at least one light grid at a distal end of said formable portion further comprises:
disposing a first light grid comprising a first grid angle at said distal end of said formable portion.

37. The method of claim 33, wherein said disposing at least one light grid at a distal end of said formable portion further comprises:
disposing a second light grid comprising a second grid angle at said distal end of said formable portion.

38. The method of claim 33, wherein said disposing at least one light grid at a distal end of said formable portion further comprises:
disposing a first light grid comprising a first grid angle and second light grid comprising a second grid angle at said distal end of said formable portion.

39. The method of claim 38, further comprising:
generating a third grid angle based on a combination of said first grid angle and said second grid angle.

40. A method for forming a photographic system, said method comprising:
providing a bezel wherein said bezel comprises an alignment feature;
providing at least one light grid aligned with said alignment feature of said bezel, wherein said at least one light grid is configured to be retained in said bezel; and
providing a formable portion configured to be formed in a shape of a snoot and for receiving said bezel.

41. The method of claim 40, wherein said providing at least one light grid that is aligned with said alignment feature of said bezel comprises:
providing a first light grid comprising a first grid angle, wherein said first light grid comprises an alignment feature corresponding to an alignment feature of said bezel.

42. The method of claim 40, wherein said providing at least one light grid that is aligned with said alignment feature of said bezel comprises:
providing a second light grid comprising a second grid angle, wherein said second light grid comprises an alignment feature corresponding to an alignment feature of said bezel.

* * * * *